United States Patent [19]

Bellanger et al.

[11] 4,020,288
[45] Apr. 26, 1977

[54] SYSTEM FOR DATA TRANSMISSION THROUGH THE CHANNELS OF A FREQUENCY DIVISION MULTIPLEX SYSTEM

[75] Inventors: Maurice Georges Bellanger, Antony; Jacques Lucien Daguet, St. Maur des Fosses, both of France

[73] Assignee: Telecommunications Radioelectriques et Telephoniques T.R.T., Paris, France

[22] Filed: Oct. 17, 1975

[21] Appl. No.: 623,349

[30] Foreign Application Priority Data

Oct. 30, 1974 France ............................ 74.36235

[52] U.S. Cl. .......................................... 179/15 FD
[51] Int. Cl.² .......................................... H04J 1/08
[58] Field of Search ........ 179/15 FD, 15 A, 15 BP, 179/15 BS, 15 BY, 15 BM, 15 FS

[56] References Cited

UNITED STATES PATENTS

3,733,438  5/1973  Haley ............................ 179/15 FD
3,872,257  3/1975  Bleickardt ...................... 179/15 BS
3,912,870  10/1975  Roy ................................ 179/15 FS

Primary Examiner—Kathleen H. Claffy
Assistant Examiner—Joseph A. Popek
Attorney, Agent, or Firm—Frank R. Trifari; Simon L. Cohen

[57] ABSTRACT

Parallel data transmission system in which the data signals are converted to multilevel digital signals and transmitted through the channels of a frequency division multiplex system. To compensate for the delays between the data signals received in the various channels of the multiplex, a pilot signal is transmitted in each channel in the form of a signal which only has a real component. At the receiver side a filter circuit is used which comprises a first fixed coefficient part at whose input the data signal is multiplied by a component of the received pilot signal and a second part having two variable coefficients which are derived from the two components of the received pilot signal.

7 Claims, 11 Drawing Figures

SYSTEM FOR DATA TRANSMISSION THROUGH THE CHANNELS OF A FREQUENCY DIVISION MULTIPLEX SYSTEM

The invention relates to a parallel data transmission system in which data signals are converted into multilevel digital signals and transmitted through the channels of a frequency division multiplex system, which channels are separated by means of digital filters having a linear phase characteristic, each channel comprising two quadrature sub-channels for transmitting two data signals which jointly constitute a complex data signal transmitted by said channel.

Parallel data transmission systems have recently been the object of a certain number of publications notably an article by Saltzberg titled "Performance of an efficient parallel data transmission system" published in "IEEE Transactions on Communication Technology", Vol. COM-15, No. 6, December 1967, pages 805 to 811. As regards the realization of the aforesaid frequency division multiplex system in which the channels are separated by means of digital filters having a linear phase characteristic, reference is made to, for example, French Patent No. 2,188,920 in the name of Applicants.

Parallel data transmission systems may permit the transmission at an increased binary rate in each channel, for example 48 kbit/s in a telephone voice channel. But a considerable difficulty in the realization of these systems is caused by the distortions produced by the transmission medium. Particularly phase distortion in the entire frequency band of a multiplex system causes time delays between the data signals received in the various multiplex channels. To recover the received data signals inspite of these delays, Saltzberg proposes a separate adjustment of the data sampling instants in each channel, which adjustment can be realized in practice by means of an automatic equalizer for each channel. Automatic equalizers are, in general, intricate and costly devices formed on the basis of digital filters having a great number of variable coefficients which must be controlled by as many calculating circuits. On that account a parallel data transmission system according to this conception is costly to realize.

It is an object of the invention to provide a parallel data transmission system having simpler and less costly means to mitigate the difficulties of recovering the data in the presence of distortions of the transmission medium.

According to the invention the parallel data transmission system is characterized in that the transmitter side comprises means for adding to the data signal in one of the said sub-channels of each channel a pilot signal whose frequency is half the interval between adjacent center frequencies of the said multiplex channels and in that the receiver side successively comprises filter means at the output of each channel for selecting the complex signal corresponding to the transmitted pilot signal, means for subtracting from the received complex signal in each channel the received complex pilot signal to obtain the received complex data signal, phase shifting means for shifting the phase of the said received complex data signal over an angle of equal magnitude but of opposite sign of the phase of the received complex pilot signal, and a pair of digital filter circuits for processing the complex data signal supplied by the said phase shifting means, said filter circuits being identical and having the transfer function of a low-pass filter with a cut-off frequency equal to the pilot signal frequency, each filter circuit comprising at least a calculating unit element constructed as a digital filter and comprising a first fixed coefficient part at whose input the data signal is multiplied by a predetermined component of the received complex pilot signal and a second part variable coefficient part whose coefficients are derived from the components of the received complex pilot signal.

In the system according to the invention the digital filter circuits which process the received complex data signal perform the same function as the automatic equalizers proposed for the known system, but they are much simpler. For example, they comprise only two variable coefficients in their second part, which coefficients are calculated on the basis of two components of the received complex pilot signal. In the first part the input signal is simply multiplied by a predetermined component of this pilot signal while all the coefficients are fixed.

A better understanding of how the invention may be realized will be provided by the following description in conjunction with the accompanying drawings, given by way of non-limitative examples.

Figure 1:
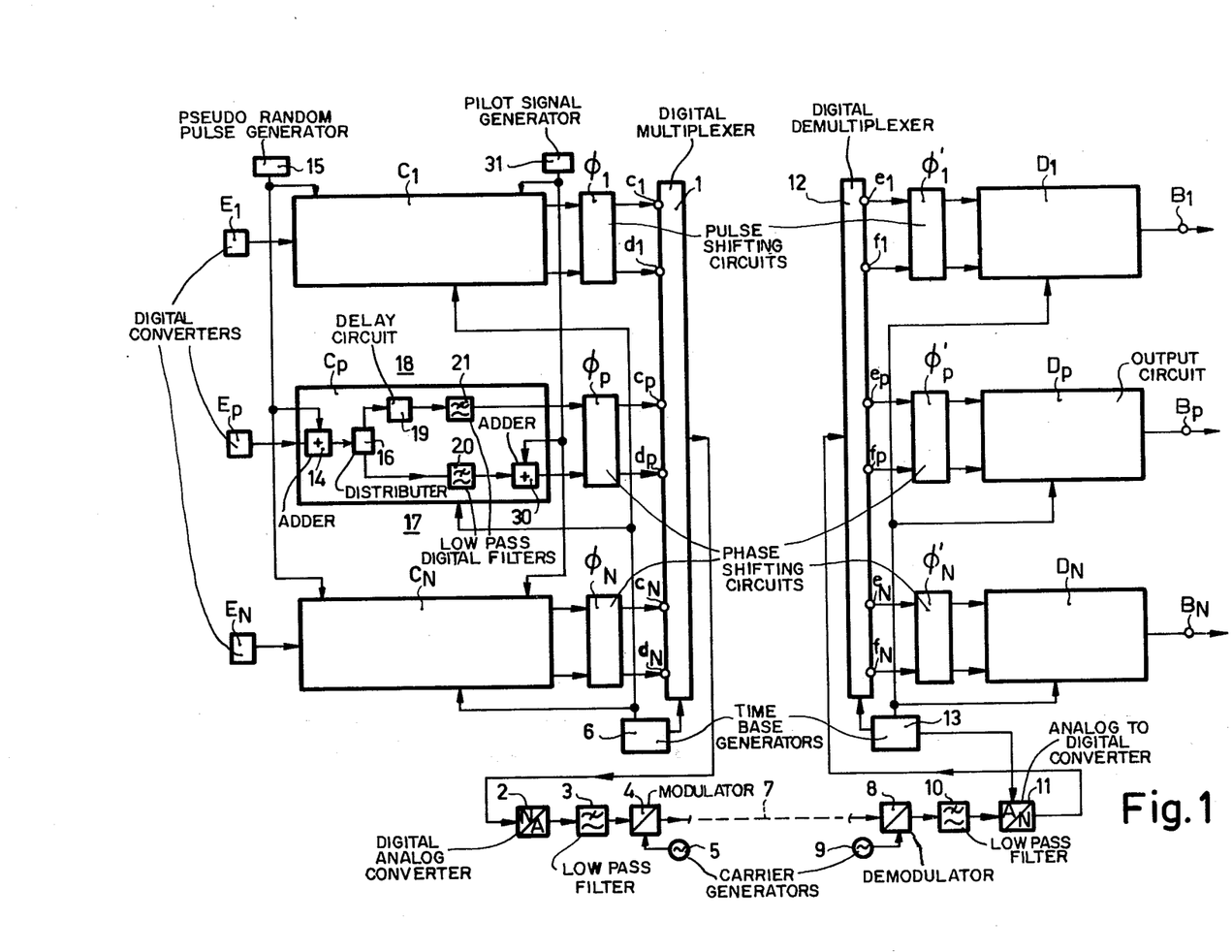
FIG. 1 shows a block diagram of a parallel transmission system comprising the components according to the invention at the transmitting end.

In the data transmission system according to the invention shown in FIG. 1, N binary data signals to be transmitted are applied to convertors $E_1...E_p...E_N$ in which, by grouping a certain number of consecutive bits, they are converted into multilevel digital signals. For example these digital signals are composed of 8-bit numbers.

In the envisaged mode of parallel transmission, these digital signals are to be transmitted through the channels of a frequency division multiplex system, each channel of this multiplex system comprising two quadrature sub-channels for transmitting two data signals. At the transmitting end, each multiplex channel comprises therefore two input terminals $(c_1, d_1)...(c_p, d_p)...(c_N, d_N)$ which correspond to the two quadrature sub-channels of the channel. As is customary, two signals applied to the two input terminals of a channel, for example the terminals $c_p$ and $d_p$, may be considered to jointly constitute a complex signal whose real part is applied to the terminal $c_p$ and whose imaginary part is applied to the terminal $d_p$. In a similar way, at the receiving end each multiplex channel comprises two output terminals $(e_1, f_1)...(e_p, f_p)...(e_N, f_N)$ which supply the transmitted complex signal. The real part of this complex signal is found at the terminals $e$ and the imaginary part at the terminals $f$.

Between these input and output terminals of the multiplex channel, there are located at the transmitting end a digital multiplexer 1, a digital-to-analog converter 2, a low-pass filter 3 which supplies the base band frequency division multiplex signal, which signal is transposed to the desired band by a modulator 4 which is fed by the signal of a carrier generator 5. The clock signals required for the functioning of digital multiplexer 1 and the other digital circuits described hereinafter are derived from a time base 6. Located at the receiving end, after the transmission line 7, are components which correspond to those at the transmitting end: a demodulator 8 which is fed by the signal of a carrier generator 9, a low-pass filter 10, an analog-to-digital converter 11 and, finally, a digital demultiplexer 12.

A time base 13 which is controlled in frequency and in phase by the time base 6 located at the transmitting end supplies the clock signals required for the functioning of the digital demultiplexer 12 and the other digital circuits described hereinafter. It also supplies the sampling frequency for the received multiplex signal to the analog-to-digital converter 11.

To be able to transmit data signals, the channels of the frequency division multiplex system formed in the multiplexer 1 and the demultiplexer 12 must be separated by means of filters which are linear in phase. To realize such a multiplex system, for example the devices described in the abovementioned French Patent No. 2,188,920 may be used. The multiplexers and the demultiplexers described in this patent specification comprise, particularly for separating the channels, digital filters of the non-recursive type which also have a linear phase characteristic. In the case of a multiplex system for telephone voice signals the central frequencies of the adjacent channels of the multiplex system are spaced at $\Delta f = 4$KHz and the attenuation characteristics of the channel separating filters are as shown by the curves in FIG. 2 for 3 adjacent channels. It will be noted that these filters produce an effective passband of 3400Hz ($\pm$ 1700 Hz around the central frequency) in each channel, this passband being suitable for the transmission of telephone voice signals.

Moreover, in the system described in the above-mentioned patent specification the frequency of the numbers in the digital signals at the input and at the output of the channels is equal to $\Delta f = 4$KHz.

To describe the parallel transmission system of FIG. 1 in more detail it is supposed that the multiplex system used is a telephony multiplex system having the properties described above.

It is also supposed that in the digital signals at the output of the converters $E_1...E_p...E_N$ the numbers consist each of $n=8$ bits and are produced at a frequency of 6KHz.

To form, on the basis of these digital signals, the pairs of digital signals which are suitable for transmission through the quadrature sub-channels of the multiplex channels, a certain number of operations which are normal or which are rendered necessary by the prescribed rating of the channels of the telephony multiplex system used are performed in the input circuits $C_1...C_p...C_N$. All input circuits are identical and therefore only the input circuit $C_p$ is described in detail by way of example.

To start with, by means of a circuit 14 a supplementary bit of a given pseudo-random sequence provided by a generator 15 is added to each of the 8-bit numbers provided by the converter $E_p$, where this supplementary bit is in the position of the least significant bit of the resulting 9-bit number. The data will be transmitted in this 9-bit number form. As will be seen from what follows hereinafter, the recognition at the receiving end of the transmitted pseudo-random sequence permits the recovery of the data timing signal in its correct phase.

By means of a distributor 16 the numbers produced at the frequency of 6KHz at the output of circuit 14 are equally distributed over two circuit branches 17 and 18. The branch 17, often called hereinafter the real branch, supplies the real part of the data signal to the input $d_p$ of the multiplex channel $p$. The branch 18, called the imaginary branch, supplies the imaginary part of the data signal to the input $d_p$ of multiplex channel $p$. The numbers in these two branches 17, 18 occur at the frequency of 3KHz and, owing to a delay circuit 19 arranged at the input of the imaginary branch 18, they occur simultaneously in the two branches.

Figure 2:
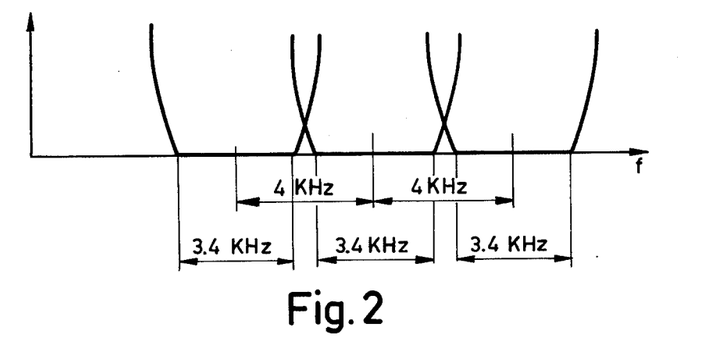
FIG. 2 shows the characteristic of the separating filters of the multiplex channels.
Figure 3:
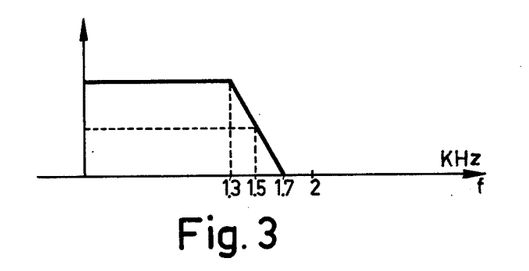
FIG. 3 shows the characteristic of a low-pass filter utilized at the transmitting end for limiting the data signal spectrum.

Furthermore the two branches 17, 18 comprise the low-pass digital filter circuits 20 and 21 in order to limit the flat spectrum of the data signal so that, after transposition to a multiplex channel, the spectrum of the data signal does not exceed the passband of the channel which is 3400Hz in the example (see FIG. 2). To realize this, the filter circuits 20 and 21 must eliminate all the components of the data signals of frequencies above 3400Hz/2. To avoid intersymbol interferences these filter circuits must satisfy the Nyquist criterion, which implies in this example, where the frequency of the numbers representing the data at the input of the filter circuit is 3000Hz, that the cut-off frequency of the filter circuit 20 and 21 must be 1500Hz. The curve in FIG. 3 shows a filter characteristic of the filter circuits 20 and 21 which satisfies these conditions.

Moreover, the filter circuits 20 and 21 are used to change the sampling frequency of the digital signals in the branches 17 and 18. This sampling frequency is 3KHz at the input of the filter circuits, but as has been shown the sampling frequency required at the input of the channels of the envisaged telephony multiplex system is 4KHz.

Figure 4:
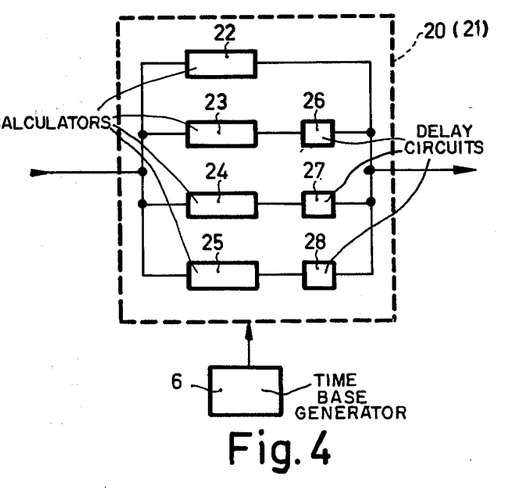
FIG. 4 shows a block diagram of the filter which has the characteristic of FIG. 3.

To realize the limitation of the spectrum and the change in the sampling frequency the filter circuits 20 and 21 may be constructed according to the diagram shown in FIG. 4. The input numbers having a frequency of 3KHz are applied to 4 calculators 22, 23, 24, 25. Connected to the output of the calculators 23, 24, 25 are delay circuits 26, 27, 28 which produce delays of T, 2T and 3T, respectively, T being the period corresponding to the frequency of 4KHz. The outputs of calculator 22 and delay circuits 26, 27, 28 are interconnected to provide the output numbers of the filter circuits 20 or 21. In the calculators 22 – 25 the calculations are performed at a rate of 1 KHz derived from time base 6.

These calculations will be further explained with reference to the diagrams of FIG. 5. Diagram 5a shows the sequence of the numbers $\sigma_i$ ($i$ is an integer varying from $-\infty$ to $+\infty$) which occur at the rate of 3KHz at the input of calculators 22 – 25. The diagram 5b shows the sequence of the numbers $S_k$ ($k$ is an integer varying from $-\infty$ to $+\infty$) and which are obtained at the output of filter circuits 20 or 21 at the rate of 4KHz. In calculators 22 – 25 the calculations are performed simultaneously at the rate of 1 KHz, for example at the instants at which the input numbers ... $\sigma_{-3}, \sigma_0, \sigma_3$ occur which are separated by intervals of 4T=1mS. Thus, at the reference instant $t=0$ that input number $\sigma_0$ occurs, calculators 22, 23, 24, 25 calculate the output numbers $S_0, S_1, S_2, S_3$, respectively. In these calculators which are, for example, realized in a non-recursive form, the output numbers are obtained by the weighted summation of a specific number of input numbers, the weighting coefficients for each calculator being predetermined values of the impulse response of the filter having the characteristic shown in FIG. 3. This impulse response is zero at all multiples of 1/(3KHz), as it relates to a Nyquist filter having a cut-off frequency of 1.5 KHz.

Diagrams 5c, 5d, 5e, 5f show such an impulse response which is limited in duration and centered respectively about the instants where the output numbers $S_0, S_1, S_2, S_3$ must occur to be calculated at the reference instant $t = 0$.

Calculator 22 calculates the output number $S_0$ while performing the weighted summation of the input numbers which occur during the duration of the impulse response 5c, the weighting coefficients used being the values of this impulse response at the instants the input numbers occur. In this particular case it can be seen that all the weighting coefficients are zero except the coefficient which is equal to the central value of the impulse response, which central value is equal to 1. In fact the output number $S_0$ is the same as the input number $\sigma_0$ and the calculator 22 might be replaced by a direct connection.

Calculator 23 calculates the output number S1 while performing the weighted summation of the numbers which occur during the duration of the impulse response 5b, the weighting coefficients used being the values of this impulse response (represented by the dotted lines) at the instant at which these input numbers occur. In the same manner the calculators 24 and 25 calculate the output numbers $S_2$ and $S_3$ from the impulse responses 5e and 5f. The output numbers $S_1$, $S_2$, $S_3$ thus calculated at the instant $t = 0$ are shifted in time over 1/(4KHz), 2/(4KHz), 3/(4KHz) by means of delay circuits 26, 27, 28 to be placed at the instants where they must occur according to diagram 5b. This calculation process repeats itself at the rate of 1KHz at all the instants in phase with the reference instant $t=0$.

In this way a pair of data signals filtered according to the filter characteristic of FIG. 3 is finally obtained at the output of filter circuits 20 and 21 in the form of two series of numbers occurring at the rate of 4 KHz. As has been seen this pair of signals may be considered as a complex signal to be transmitted through a multiplex channel. Before applying the various complex data signals to the inputs of the various multiplex channels it is advantageous to perform a certain mutual phase shifting of these complex signals. This is effected in phase shifting circuits $\phi_1,... \phi_P... \phi_N$, which shift the complex data signals at their input over $0, ..., 2\pi p/N, ...,$ $2\pi$ (N−1)/N, respectively. The object of this phase shifting operation is a better distribution of the energy in the samples of the multiplex signal at the output of the multiplexer 1 in order to avoid the necessity for too large a dynamic range for the processing of this signal.

In phase shifting circuit $\phi_1', ..., \phi_P', ...\phi_N'$ at the receiving end of the multiplex system, the complex signals obtained at the various output pairs of demultiplexer 12 are subjected to phase shifts of equal magnitude but of opposite sign of those effected in the corresponding phase shifting circuits at the transmitting end.

Output circuits $D_1...D_p...D_N$ are connected to the output of phase shifting circuits $\phi_1', ... \phi_p', ... \phi_N'$ in order to provide to the output terminals $B_1...B_pB_N$ the multilevel data signals such as have been provided from the transmitting end by the convertor circuits $E_1...E_p...E_N$.

If the transmission line 7 does not introduce any phase and amplitude distortion, the complex signals provided to the output circuits $D_1 ... D_p ... D_N$ and the complex signals provided by the corresponding input circuits $C_1...C_p...C_N$ would be identical in phase and in amplitude. In this case operations reciprocal to those effected in the corresponding input circuits at the transmitting end are effected in the output circuits $D_1...D_p...D_N$ while using clock signals derived from time base 13.

But actually the transmission line 7 always brings about phase and amplitude distortion which may vary with time. In particular the phase distortion in the total frequency band of the multiplex system produces delays between the data signals received in the various multiplex channels. If the same processes are performed on these mutually delayed data signals in the output circuits $D_1...D_p...D_N$ with the same clock signals derived from the time base 13 interference between the successive data signals issued from each channel will be produced, which data will be restored with an unacceptable error rate.

To avoid this fault caused by the transmission line distortion, each output circuit $D_1...D_p...D_N$ might comprise a known automatic adaptive device compensating for the delay of the corresponding channel. Devices of this type are complex and costly for they comprise digital filters, all coefficients of which are variable and each coefficient of which must be permanently controlled by a separate control circuit.

By means of the present invention it is possible to obtain substantially the same result as with known automatic adaptive devices but with much simpler means.

Figure 6:
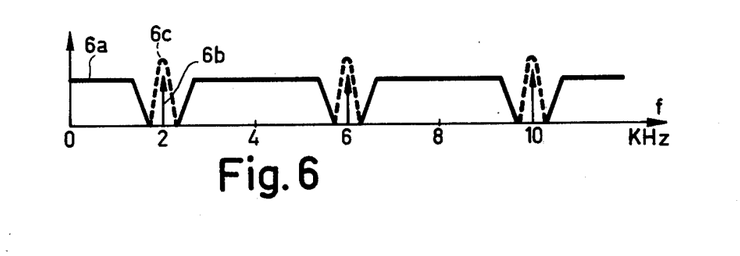
FIG. 6 shows the spectrum of the signal transmitted in a multiplex channel and the characteristic of selection filters for the received pilot signal.

According to the invention the data transmission system of FIG. 1 comprises at the transmitting end in each input circuit such as $C_p$ an adder 30 included in the real branch 17. This adder receives at one input the real data signal at the rate of 4KHz provided by filter circuit 20 and at its other input a digital signal corresponding to a pilot signal and supplied by a generator 31. The frequency of this pilot signal is half the interval of 4KHz between adjacent center frequencies of the multiplex channels, i.e. 2 KHz. If the amplitude of the pilot signal is A, this pilot signal is applied to an input of adder 30 in the form of a series of numbers +A, −A, +A, −A, ... which occur at the rate of 4KHz, simultaneously with the data signal numbers applied to the other input of the adder. In this way it is obtained that the complex signals applied to the channels of the multiplex system at the transmitting end comprise only a real component of the pilot signal. The spectrum of the signal transmitted in each multiplex channel has the shape of the curves shown in solid lines in FIG. 6. In the baseband this spectrum is formed by the data spectrum 6a which is limited to 1700Hz in accordance with the filter function of FIG. 3 and by the line 6b at 2KHz which represents the pilot signal. Of course this spectrum reproduces itself around the 4KHz sampling frequency and its multiples.

Figure 7:
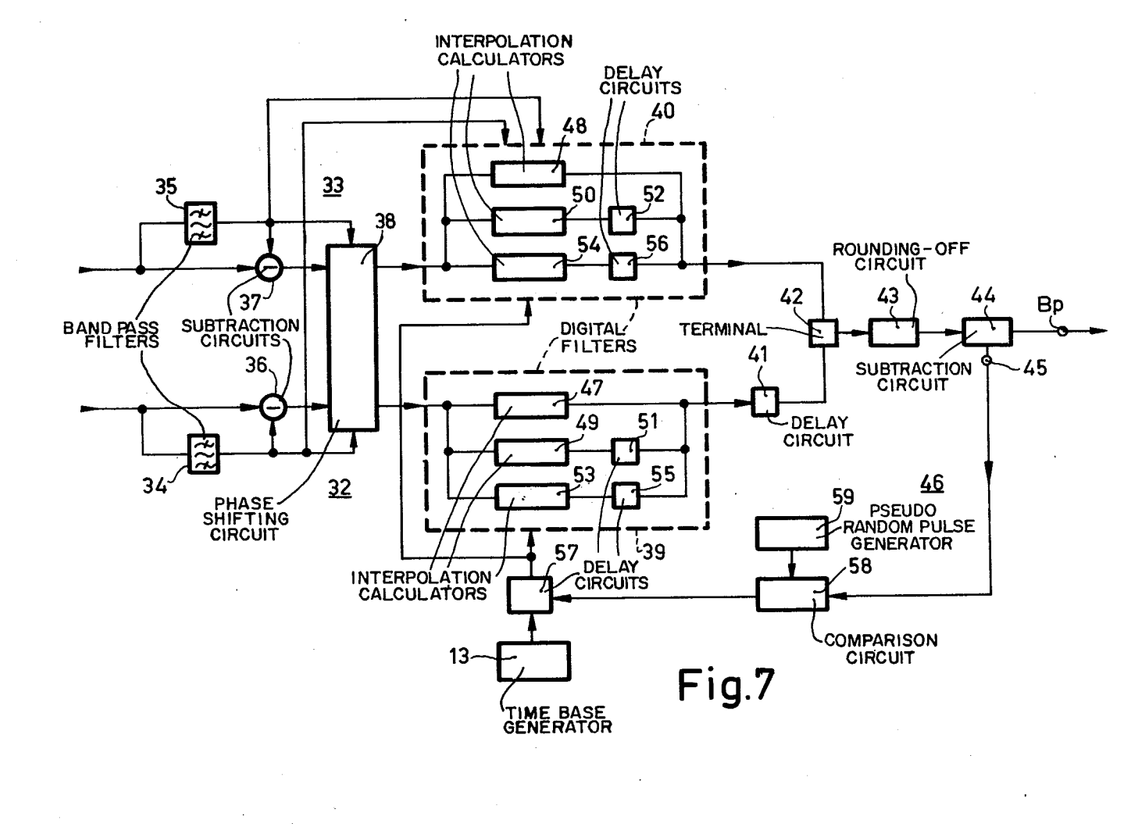
FIG. 7 shows a block diagram of the circuits connected at the receiving end to the output of each channel.

At the receiving end the output circuits $D_1...D_p...D_N$ are each constructed according to the diagram of FIG. 7. Each output circuit $D_p$ comprises two branches 32 and 33 to process the real component and the imaginary component respectively of the complex signal received from multiplex channel p. In view of the phase distortions of the transmission medium the pilot signal which has only been transmitted in the real branch 17, presents at the receiving end components in the two branches 32 and 33. Consequently these two branches 32 and 33 comprise two passband filters 34 and 35 to select respectively the real and the imaginary component of the pilot signal. The two filters 34 and 35 have a filter characteristic of the kind shown in FIG. 6 by the dashed curves such as the curve 6c.

It is useful for what follows hereinafter to express the value of the two components of the pilot signal selected by the filters 34 and 35 as a function of the delay $\tau$ brought about by the transmission line in the pilot signal transmitted through the channel. If T is the period which corresponds to 4KHz, the frequency 2KHz of the pilot signal is $1/(2T)$. The pilot signal transmitted with zero phase is consequently received with a phase equal to $2\pi\tau/2T = \pi\tau/T$. From this it can be derived that the real and imaginary components of the pilot signal selected by the filters 34 and 35 have the respective values $\cos(\pi\tau/T)$ and $\sin(\pi\tau/T)$. It should be noted that this delay $\tau$ of the pilot signal in a channel very well characterizes the delay of the data signal in this channel. It can be actually shown that in a channel having a central frequency $f_p$ and a width of 4KHz, the delay $\tau$ of the pilot signal on reception is:

$$\tau = (\tau_1 + \tau_2)/2$$

$\tau_1$ and $\tau_2$ being the delays at the frequencies $f_p + 2$KHz and $f_p - 2$KHz situated at the edges of the channel.

On the other hand the two branches 32 and 33 comprise the substraction circuits 36 and 37 by means of which the two components of the pilot signal are subtracted from the two components of the received signal. These two subtraction circuits 36 and 37 together provide the complex data signal which is supplied to a phase shifting circuit 38. This phase shifting circuit 38 also receives the two components of the pilot signal jointly constituting the complex pilot signal and causes the phase of the complex data signal to rotate over an angle $-\pi\tau/T$ of equal magnitude but of opposite sign of the phase of the complex pilot signal.

Figure 8:
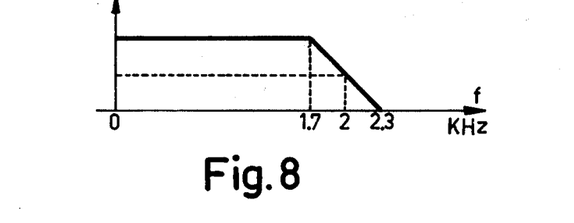
FIG. 8 shows the characteristic of a filter circuit for the received data signal.

At the output of phase shifting circuit 38 the two branches 32 and 33 comprise two digital filter circuits 39 and 40 which are identical and which have the filter characteristic of a low-pass filter with satisfies the Nyquist criterion with a cut-off frequency equal to the frequency 2KHz of the transmitted pilot signal. Such a filter characteristics may have the form shown in FIG. 8, having a transition band starting at 1.7KHz in order not to suppress any component of the transmitted data signal.

These two filter circuits 39 and 40 have a double function. Their first function, which is complementary to that ensured by the filter circuits 20 and 21 at the transmitting end, is to change the sampling frequency of the digital signal in the branches 32 and 33. At the input of the filter circuits this sampling frequency is 4KHz and the sampling frequency required in each branch for recovering the data is 3KHz. The means to ensure this first function will be described hereinafter. The second function of the two filter circuits 39 and 40 is the automatic compensation of the delay introduced in the data signal of each channel by the phase distortion of the transmission line. This second function is ensured by utilizing the two components $\cos(\pi\tau/T)$ and $\sin(\pi\tau/T)$ in the filter circuits 39 and 40. As will be shown hereinafter each filter circuit consists of two parts, a first fixed coefficient part at whose input the data signal is multiplied by a predetermined component of the pilot signal and a second variable coefficient part whose coefficients are derived from the components of the received pilot signal. At the output of filter circuits 39 and 40 ensuring these two functions the data signals of the two branches 32 and 33 present themselves as two sequences of numbers which occur simultaneously at the rate of 3KHz. A delay circuit 41 produces a delay equal to 1(6KHz) in the real branch 32. The two branches are interconnected at a terminal 42 at which a data signal is obtained in the form of a sequence of numbers which occur at the frequency of 6KHz. In a circuit 43 each number of this sequence is rounded off to 9 bits, In a subtraction circuit 4 the least significant ninth bit is extracted from each of these 9-bit numbers. The sequence of 8-bit numbers supplied by circuit 44 is passed to a terminal $B_p$. If the preceding processes have been correct, at this terminal $B_p$ the 8-bit multilevel data signal must be found which has been supplied by the converter $E_p$ at the transmitter side. In this case where the data signal has be restituted without error the sequence of ninth bits obtained at an output 45 of circuit 44 must be formed by the pseudo-random sequence which has been added to the data signal at the transmitter side. This digital signal of ninth bits is used in a phase-locked loop 46 which intervenes in the functioning of filter circuits 39 and 40 and which will now be described in detail.

In order to ensure their first function indicated above, i.e. to change the sampling frequency of the data signals from 4KHz to 3KHz, the filter circuits 39 and 40 are formed by three parallel branches. The corresponding branches of the two circuits comprise identical elements. The first branch of the filter circuits 39, 40 comprises an interpolation calculator 47, 48. The second branch comprises an interpolation calculator 49, 50 which is in series with a delay circuit 51, 52 effecting a delay equal to $(4/3).1/(4KHz)$. The third branch comprises an interpolation calculator 53, 54 which is in series with a delay circuit 55, 56 effecting a delay equal to $(8/3).1/(4KHz)$. In all the calculators, the calculations are made at the rate of clock signals derived from time base 13. These clcok signals have a frequency of 1 KHz and their phase is determined by a delay circuit 57 which can produce a delay varying in steps of $1/(4KHz)$. In phase-locked loop 46 this variable delay is controlled by the output of a comparison circuit 58 which compares the digital signal of the ninth bits with the pseudo-random sequence provided by a local generator 59 and which must be identical to the transmitted one.

First of all the functioning of these filter circuits 39, 40 will be explained in the case they are connected to a specifc multiplex channel which will be called the reference channel hereinafter. This reference channel, which is generally located near the middle of the toal multiplex frequency band, is the one which transmits the signal that is utilized for synchronising time base 13 at the receiver side as to frequency and phase with time base 6 at the transmitter side. This signal utilized for the synchronisation of the receiver may, for example, be the pilot signal transmitted in this channel. For this reference channel the received pilot signal has the same phase as when it was transmitted and therefore comprises one real component just as at the transmitter end. At the receiver end there is not any problem of compensating for the delay of the data signal and the only object of the filter circuits 39, 40 is to change the sampling frequency of the data signals.

Figure 5:
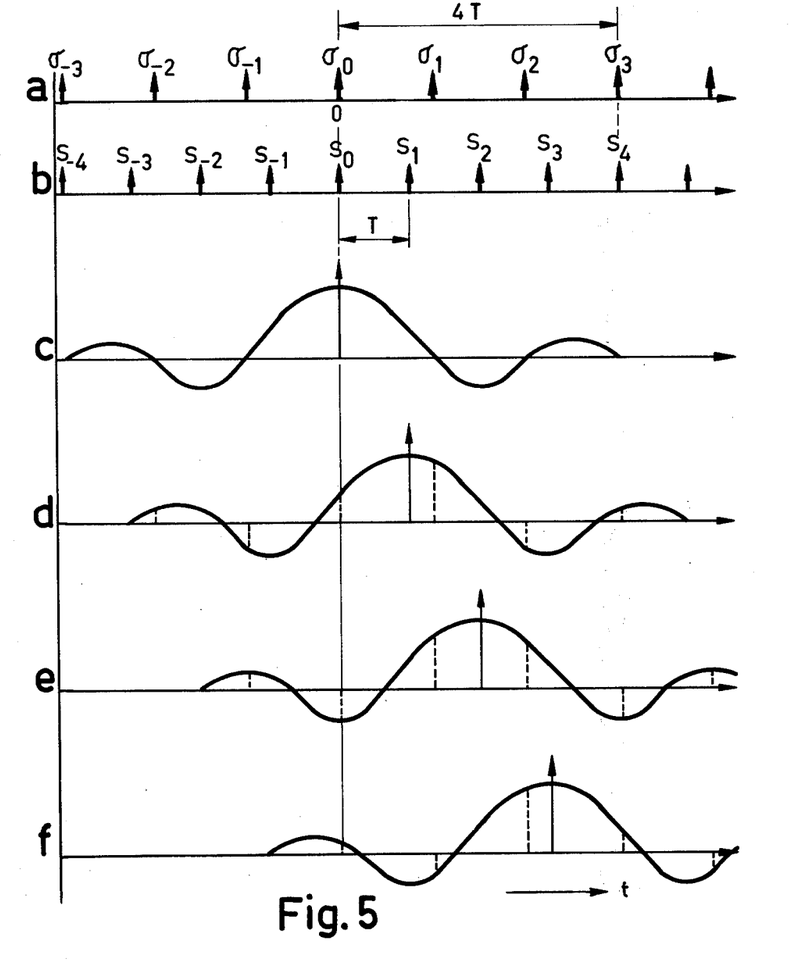
FIG. 5 shows diagrams which explain the operation of the filter of FIG. 4.

The filter circuits 39 and 40 are identical and in the case of the reference channel they effect interpolation calculations of the same kind as those which are explained by the diagrams of FIG. 5 for the filter circuis 20 and 21 at the transmitter end. For example for filter circuit 39, these calculations will be described in detail by means of the diagrams of FIG. 9.

Figure 9:
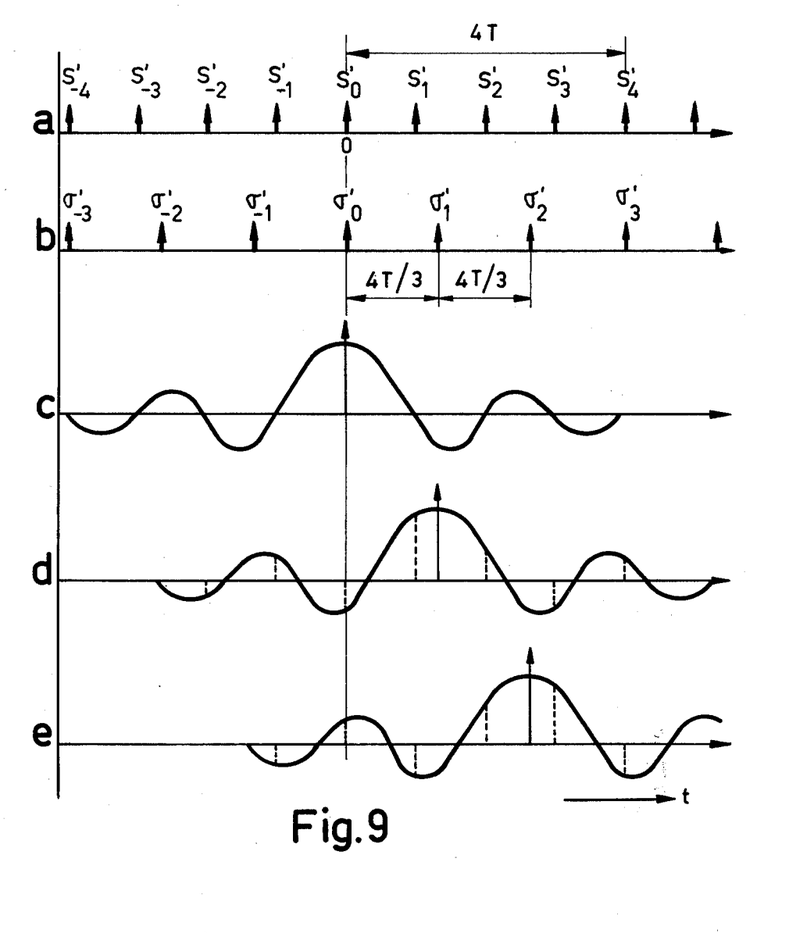
FIG. 9 shows diagrams explaining the operation of a calculating unit of the filter circuit coupled to the reference channel.

Diagram 9a represents the sequence of numbers $S'_k$ ($k$ is an integer varying from $-\infty$ to $+\infty$) occurring at the rate of 4KHz at the input of calculators 47, 49, 53. Diagram 9b represents the sequence of numbers $\tau'_i$ ($i$ is an integer varying from $-\infty$ to $+\infty$) which can be obtained at the output of filter circuit 39 at the rate of 3KHz. The numbers $S'_k$ correspond to the numbers having the same index $S_k$ at the transmitter end which are shown in diagram 5b of FIG. 5 and the numbers $\sigma'_i$ which correspond to the numbers $\sigma_i$ at the transmitter end which are shown in diagram 5a of FIG. 5. In particular the numbers $\sigma_0'$ and $S_0'$ which occur at the reference instant $= 0$ at the receiver end correspond with the numbers $\sigma_0$ and $S_0$ which occur at the transmitter end at the reference instant $t = 0$. In calculators 47, 49, 53, these calculations are effected simultaneously at the sampling frequency of 1KHz derived from time base 13, at instants which must be in phase with the reference instant $t = 0$.

Let us suppose for the moment that this correct phase of the sampling frequency of 1KHz is obtained. In calculators 47, 49, 53 which are for example constructed in the non-recursive form the output numbers $\sigma'_i$ are obtained by a weighted summation of a specific number of input numbers $S'_k$, the weighting coefficients being derived from the impulse response of the filter having the characteristic shown in FIG. 8. This impulse response is zero at all multiples of 1/(4KHz) as it relates to a Nyquist filter having a cut-off frequency of 2KHz.

Diagrams 9c, 9d, 9e show such an impulse response of finite duration and located at the respective instants where the output numbers $\sigma_0'$, $\sigma_1'$, $\sigma_2'$ must occur, to be calculated at the instant $t = 0$.

Calculator 47 calculates the output number $\sigma_0'$ taking the weighted sum of the input numbers which occur during the duration of the impulse response 9c, the weighting coefficients utilized being the values of this impulse response at the instant where the input numbers occur. In this particular case it will be seen that all the weighting coefficients are zero except the one which is equal to the central value of the impulse responsne, which central value is equal to 1. In this case the output number $\sigma'_0$ is the same as the input number $S'_0$.

The calculators 49 and 53 calculate the output numbers $\sigma'_1$ and $\sigma'_2$, respectively, taking the weighted sum of the input numbers $S'_k$ which occur during the duration of the impulse responses 9d and 9e. The weighting coefficients utilized are the values of the impulse response 9d and 9e at the instants where the input numbers occur; these values are shown by dashed lines.

The output numbers $\sigma'_1$ and $\sigma'_2$ calculated in this manner at the reference instant $t = 0$ are delayed in time by $(4/3).1/(4KHz)$ and by $(8/3).1/(4KHz)$ by means of the delay circuits 51 and 55 in order to be placed at the instants where they must occur in accordance with diagram 9b.

This calculation process repeates itself at the rate of 1KHz at all the instants which are in phase with the reference instant $t = 0$ and in this manner two sequences of numbers $\sigma'_i$ are obtained at the output of the filter circuits 39 and 40 which numbers occurs at the rate of 3KHz, and at the interconnection terminal 42 a sequence of numbers if obtained at the rate of 6KHz, which numbers are each rounded off to 9 bits in circuit 43.

If in calculators 47, 49, 53 and 48, 50, 54 in which the above weighted coefficients are used, the calculations are effected at a rate of 1KHz the 9-bit numbers supplied by circuit 43 are identical to the corresponding transmitted numbers at all the instants which are in phase with the reference instant $t = 0$ and the pseudo-random sequence transmitted in the digital signal as the ninth bits is found again at the input of phase locked loop 46. This sequence is recognized by comparison circuit 58 which controls the delay of variable delay circuit 57 at such a value that the signal of 1KHz supplied by time base 13 remains in phase with the reference instant $t = 0$.

If, on the contrary, the calculations are effected in the calculators at the moments input samples such as $S'_1$, $S'_2$, $S'_3$ occur, i.e. at the instants delayed with respect to the reference instant $t = 0$ by $1/(4KHz)$ $2/(4KHz)$, $3/(4KHz)$, the pseudo-random sequence transmitted in the digital signal as the ninth bits is no longer found and under the control of comparison circuit 58 variable delay circuits 57 delays the signal of 1KHz supplied by the time base 13 by steps of $1/(4KHz)$ until the pseudo-random sequence is recognized.

Now filter circuits 39 and 40 will be described in the case they are used to process the data signals issued by any channel where the data signals are received with a delay $\tau$ with respect to the data signals received in the reference channel. In this case the general structure of filter circuits 39, 40 associated with phase-locked loop 46 is the same as that shown in FIG. 7 and the functioning which will be described applies only when the condition is satisfied that filter circuits 39 and 40 compensate for the delay $\tau$ in a transmission channel. Therefore, these filter circuits must each be provided with calculators differing from those described for the reference channel.

Figure 10:
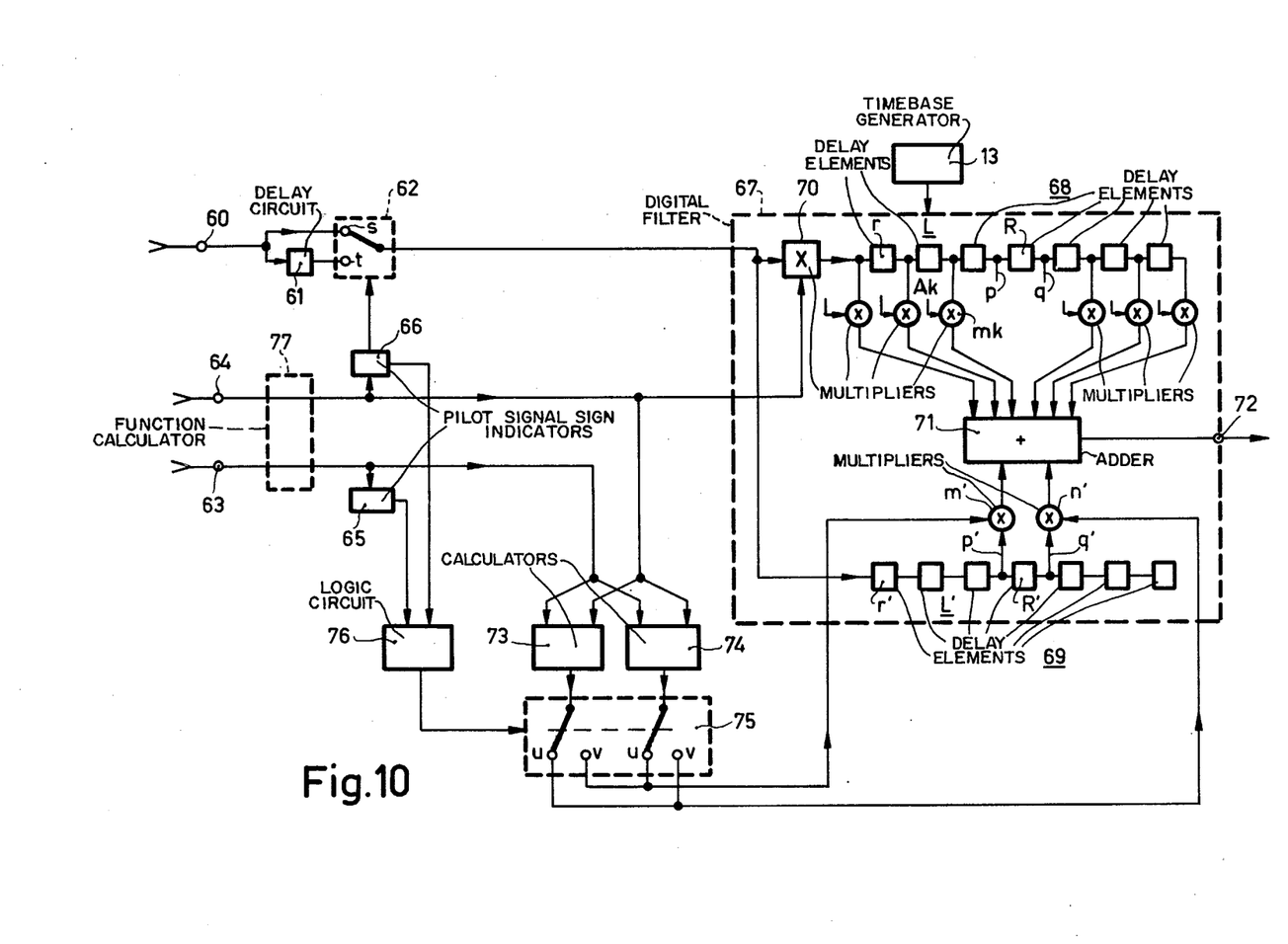
FIG. 10 shows the diagram of a calculating unit of the filter circuit coupled to any channel.

Calculators 47, 49, 53 which process the data signals of real branch 32 are each constructed according to the diagram of FIG. 10. Calculators 48, 50, 54 which process the data signal of imaginary branch 33 are identical to the corresponding calculators 47, 49, 53 of the real branch.

The numbers at a rate of 4KHz which represent the data signals and are applied to input 60 of a calculator are delayed by T = 1/(4KHz) by a delay circuit 61 or they are not delayed depending on whether switch 62 is in the position $t$ or $s$. On the other hand the real components cos ($\pi\tau/T$) and the imaginary components sin ($\pi\tau/T$) of the pilot signal derived from pilot filters 34 and 35 are applied to input terminals 63 and 64. For calculator 47 these components $\cos(\pi\tau/T)$ and $\sin(\pi\tau/T)$ are utilized directly. For a calculator such as 49 or 54 a circuit 77 is added which is designated by dashed lines and which, as will be seen from what follows hereinafter, calculates two very simple functions of $\cos(\pi\tau/T)$ and $\sin(\pi\tau/T)$. Circuits 65 and 66 supply a binary signal which corresponds with the sign of the real and of the imaginary components of the pilot signal. Circuit 66 controls switch 62 which is in position $s$ or $t$ depending on whether the imaginary component of the pilot signal is positive or negative.

At the output of switch 62 the data signals are applied to a digital filter 67 which comprises two parts 68 and 69. The first part 68 comprises at the input a multiplier 70 which multiplies the data signals by the imaginary component $\sin(\pi\tau/T)$ of the pilot signal. Multiplier 70 is followed by a delay line L comprising delay elements $r$ of duration T. The number present at the taps of the delay line, except those on the taps $p$ and $q$ on both sides of the central delay element R of this line, are multiplied with the aid of multipliers $m_k$ by fixed coefficients $A_k$ which will be further specified hereinafter and the resulting products are applied to the inputs of an adder 71.

The second part 69 of digital filter 67 comprises a delay line L' to whose input the data signals are directly applied. This delay line L' effects a total delay equal to that of the line L and comprises for instance delay cells $r'$ of a duration T. Only the two taps $p'$ and $q'$ of this line are used which are on both sides of the central delay element R'. The numbers present at these two taps are multiplied with the aid of multipliers $m'$ and $n'$ by variable coefficients $a_0$ and $a_{-1}$ and the resulting products are supplied to two inputs of adder 71. Output of adder 71 forms the output of the calculator. The numbers at this output 72 occur at the rate of 1KHz, for the calculations in filter 67 are effected at the frequency of 1KHz derived from time base 13.

The variable coefficients $a_0$ and $a_{-1}$ are predetermined functions (which will be specified hereinafter) of the components $\sin(\pi\tau/T)$ and $\cos(\pi\tau/T)$ of the pilot signal. These predetermined functions are calculated in calculators 73 and 74 which each receive the two components of the pilot signal. The digital signals supplied by circuits 73 and 74 are utilized either as coefficient $a_0$ or as coefficient $a_{-1}$ depending on the position $u$ or $v$ of a change-over switch 75. The latter is controlled by the binary output of a logic circuit 76 which receives the binary signals of circuits 65, 66 which determine the sign of the components $\cos(\pi\tau/T)$ and $\sin(\pi\tau/T)$. Depending on whether these components have the same or different signs logic circuit 76 moves switch 75 to position $u$ or to position $v$.

Figure 11:
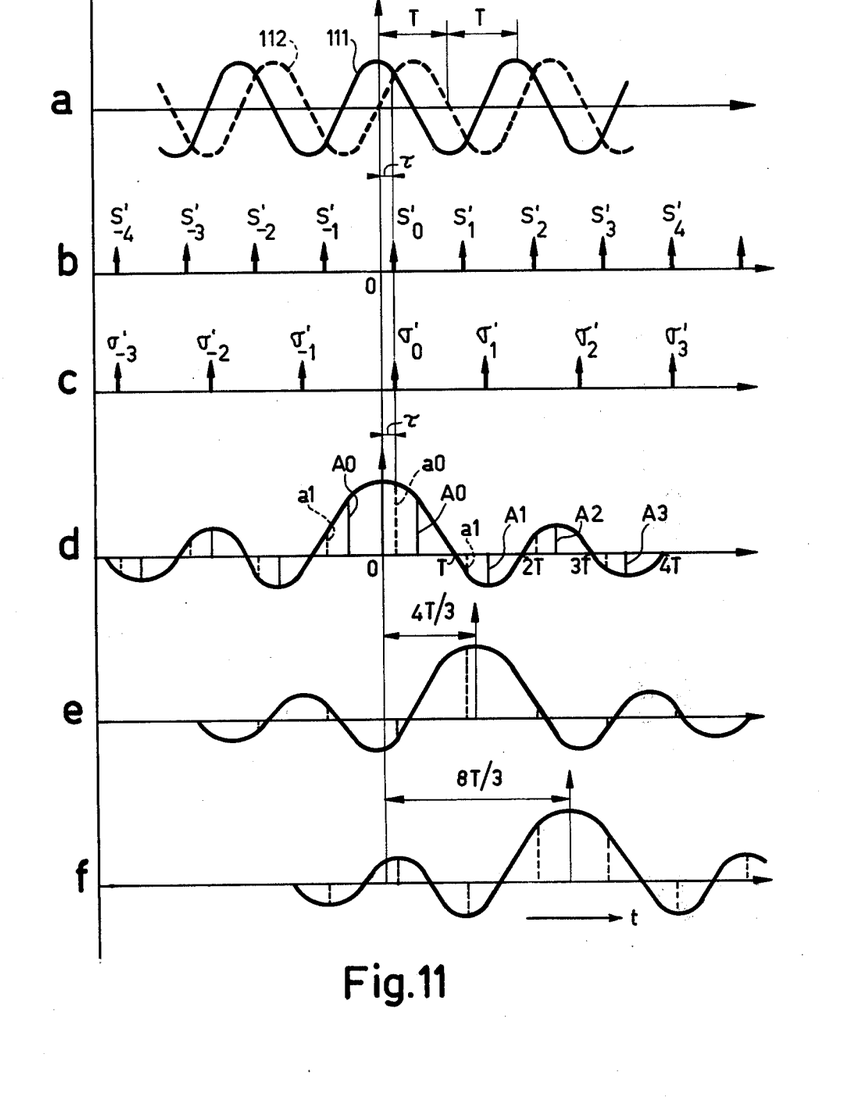
FIG. 11 shows diagrams which explain the operation of the calculating unit of FIG. 10.

The function of the calculators thus constituted will be explained by means of the various diagrams of FIG. 11.

In diagram 11a, curves 111 and 112 represent the functions $\cos(\pi t/T)$ and $\sin(\pi t/T)$, respectively, i.e. the real and imaginary parts of the pilot signal. In the reference channel these real and imaginary parts are sampled at the receiver end at the frequency 1T=4KHz at all instants which are in phase with the reference instant $t=0$. It can be verified that the imaginary component of the pilot signal is always zero at these sampling instants.

In any channel in which a forward shift of the duration $\tau$ occurs, the real and imaginary parts of the pilot signal are sampled at the same frequency 1T at the instants which are in phase with a time $\tau$ lagging with respect to the reference time $t = 0$. The real and imaginary components of the pilot signals have the values $\cos(\pi\tau/T)$ and $\sin(\pi\tau/T)$ represented by the ordinates of curves 111 and 112 at instant $\tau$. The numbers which correspond to these values are supplied to the inputs 63 and 64 of the calculator. As these curves have the period 2T it is sufficient to consider the shifts $\tau$ situated between 0 and 2T.

Diagram 11b represents in a manner analogous to diagram 9a the sequence of numbers $S'_k$ which occur at the rate of 1/T=4KHz at input 60 of the three calculators 47, 49, 53 which constitutes the filter circuit 39. These numbers occur for any channel at the instants which are in phase with the time $t = \tau$. Diagram 11c represents in a manner analogous to diagram 9b the sequence of numbers $\sigma'_i$ which must be obtained at the output of filter circuit 39. In this filter circuit 39 the calculators 47, 49, 53 supply at a rate of 1KHz the numbers such as $\sigma'_0, \sigma'_1, \sigma'_2$ respectively.

First of all, the operations to be effected in calculator 47 to compensate for this shift $\tau$ in the transmission channel will be formulated. From the input numbers $S'_k$ which occur in phase with the instants $t=\tau$ calculator 47 calculates for example at the instant $\tau$ a number $\sigma'_0$ interpolated between the input numbers $S'_k$ at the reference instant $t = 0$. For this interpolation calculation, calculator 47 determines the weighted sum of a specific number of input numbers $S'_k$ with weighting coefficients which will be specified by means of diagram 11d. This diagram 11d shows in a manner analogous to diagram 9c the impulse response of the filter having the characteristic of FIG. 8, this impulse response being centered around the reference instant $t = 0$. Calculator 47 calculates the output number $\sigma'_0$ as the weighted sum of the input numbers $S'_k$ which occur during the duration of the impulse response, the weighting coefficients used being the values (represented by the dashed lines) of this impulse response at the instants at which the input numbers occur.

If 2P input numbers $S'_k$ occur during the duration 2 PT of the impulse response 11d and if the weighting coefficients corresponding to these input numbers are denominated $a_k$ the output number $\sigma'_0$ is represented by the relation:

$$\sigma'_o = \sum_{k=-p}^{P-1} a_k S'_k \quad (a)$$

The weighting coefficients $a_k$ depend on the delay $\tau$. According to the invention, for the calculation of the output number $\sigma'_0$ advantage is taken of the fact that the weighting coefficients $a_k$ can be expressed as a function of the components $\cos(\pi\tau/T)$ and $\sin(\pi\tau/T)$ of the pilot signal.

Diagram 11d fully explains the notation used for the coefficients $a_k$. A coefficient $a_k$ represented by the dashed lines has the same index in the entire interval of length T centered at instant $t = (2k+1)T/2$. At these instants the coefficients are represented by solid lines and have the fixed values $a_k$. As the impulse respone of diagram 11d is symmetrical, the same value $A_o$ has been given to the coefficients taken at the instants $t=\pm T/2$.

To determine the values of the coefficients $a_k$ use has been made of the fact that the impulse response 11d may be approximated by the following functions:

In each of the intervals of length T centered at the instants $t=(2k+1)T/2$ for $k \neq 0$ and $k \neq 1$ the impulse response is approximated by the function $F_1$:

$$(2) \quad F_1 = A_k \sin(\pi t/T)$$

In the interval extending from $-T/2$ to $+T/2$ the impulse response is approximated by the function $$(3) \quad F_2 = A_0(a-A_0) \cos(\pi t/T)$$

In the interval extending from $-T$ to $-T/2$ and in the interval extending from $T/2$ to $T$ the impulse response is approximated by the function:

$$(4) \quad F_3 = A_0 + A_0 [\sin(\pi t/T) - 1 - \cos(\pi t/T)]/2$$

With this approximation of the impulse response the value of the coefficients $a_k$ can be expressed which must be used in the formula (1) for a delay $\tau$ brought about by the transmission channel. Various cases occur according to the value of this delay $\tau$, but, as remarked already, it is sufficient to consider the values situated between 0 and 2T.

A first case is that represented in diagram 11d where is situated between 0 and T/2. From the formulas (2), (3), and (4) the following coefficients are derived:

$$(5) \quad \begin{cases} a_k = A_k \sin(\pi\tau/T) & k \neq 0, \; k \neq -1 \\ a_0 = A_0 + (1 - A_0) \cos(\pi\tau/T) \\ a_{-1} = A_0 + A_0 [\sin(\pi\tau/T) - 1 - \cos(\pi\tau/T)]/2 \end{cases}$$

With these coefficients formula (1) is written:

$$(6) \quad \begin{cases} \sigma'_0 = \sum_{k=-P}^{P-1} A_k [S'_k \cdot \sin(\pi\tau/T)] + \\ \quad + [A_0 + (1 - A_0) \cos(\pi\tau/T)] \, S'_0 + \\ \quad + [A_0 + (A_0/2) \sin(\pi\tau/T) - 1 - \cos(\pi\tau/T)] \, S'_{-1} \\ \quad k \neq 0, \; k \neq -1 \end{cases}$$

For what follows hereinafter it is useful to remark (see diagram 11a) that this first case is entirely characterized by the fact that $\cos(\pi\tau/T)$ and $\sin(\pi\tau/T)$ have the same sign and $\sin(\pi\tau/T)$ is positive.

A second case is that where $\tau$ is situated between T/2 and T. A close look at diagram 11d shows that the coefficients $a_k$ for $k \neq 0$ and $k \neq 1$ have the values indicates in the formulas (5), whereas the coefficients $a_0$ and $a_{-1}$ are obtained by permuting the values indicated in the formulas (5).

In this second case formula (1) is then written:

$$(7) \quad \begin{cases} \sigma'_0 = \sum_{k=-P}^{P-1} A_k [S'_k \cdot \sin(\pi\tau/T)] + \\ \quad + [A_0 + (A_0/2) \sin(\pi\tau/T) - 1 - \cos(\pi\tau/T) \, S'_0 + \\ \quad + [A_0 + (1 - A_0) \cos(\pi\tau/T)] \, S'_{-1} \\ \quad k \neq 0, \; k \neq -1 \end{cases}$$

According to diagram 11a this second case is characterized in that $\cos(\pi\tau/T)$ and $\sin(\pi\tau/T)$ have different signs and $\sin(\pi\tau/I)$ is positive A third case is that where $\tau$ is situated between T and 3T/2. It is clear that the coefficients have then the same value as in the first case where $\tau$ is situated between 0 and T/2. But in the formula (1) the input numbers $S'_{k+1}$ must be taken which are delayed by T with respect to the numbers $S'_k$. According to diagram 11a this third case is characterized in that $\cos(\pi\tau/T)$ and $\sin(\pi\tau/I)$ have the same sign and $\sin(\pi\tau/T)$ is negative.

A fourth case is that were $\tau$ is situated between 3T/2 and 2T. The coefficients have the same values as in the second case where $\tau$ is situated between T/2 and T. Also in the formula (1) the input numbers $S'_{k+1}$ must be taken which are delayed by T with respect to the numbers $S_k'$. This fourth case is characterized in that $\cos(\pi\tau/T)$ and $\sin(\pi\tau/T)$ have different signs and $\sin(\pi\tau/T)$ is negative.

Consequently the formulas (6) and (7) indicate the calculations which must be effected in calculator 47 to obtain the numbers such as $\sigma'_0$. It will be shown that the calculator of FIG. 10 described above automatically effects these calculations for all the values of $\tau$ which have been envisaged.

When the delay $\tau$ produced by the transmission channel has a value situated between 0 and T (first and secnd case), switch 62 is in position $s$ under the control of sign detector 66 for the pilot signal component $\sin(\pi\tau/T)$, and the input numbers $S'_k$ are transmitted without delay. When the delay $\tau$ is situated between T and 2T (third and fourth case), switch 62 is in position $t$ and the input numbers $S'_k$ are delayed by T(by circuit 61). In accordance with the above remarks both the delayed numbers and the non-delayed numbers as supplied by switch 62 can then be processed in the same manner in filter 67, as if the delay $\tau$ wa always situated between 0 and T.

The first part 68 of filter 67 calculates the first term of $\sigma'_0$ of the formula (6) or (7). Present at the taps on the delay line L of this first part are the input numbers $S'_k$ multiplied, by means of multiplier 70, by the imaginary component $\sin(\pi\tau/T)$ of the pilot signal. In accordance with the first term of $\sigma'_0$ the central taps $p$ and $q$, which corresponds with the input numbers $S'_0$ and $S'_{-1}$, are not used. The numbers $S'_k.\sin(\pi\tau/T)$ present at the used taps on the delay line are multiplied by the fixed coefficients $A_k$ by means of multipliers $m_k$.

The second part 69 of filter 67 calculates the second and third terms of $\sigma'_0$ of the formulas (6) or (7). At the taps $p'$, $q'$ on the delay line L' which correspond to the taps $p$, $q$ on the delay line L, the input numbers $S'_0$ and $S'_{-1}$ are present. These numbers must be multiplied by means of the multipliers $m'$ and $n'$ by the coefficients indicated in the formulas (6) and (7), these coefficients being permuted depending on whether the formula (6) is applicable ($0<\tau<T/2$) or whether the formula (7) is applicable ($T/2<\tau<T$). The two circuits 73 and 74 calculate, as a function of the components $\cos(\pi\tau/T)$ and $\sin(\pi\tau/T)$ of the pilot signal, the two multiplying coefficients of $S'_0$ and $S'_{-1}$. Depending on whether these components have the same sign (the case where $0<\tau<T/2$) or have different signs (the case where $T/2<\tau<T$), logic circuit 76 moves change-over switch 75 to the position $u$ or $v$, so that the two coefficients which were processed in circuits 73 and 74 are passed to multipliers $m'$ and $n'$ or to multipliers $n'$ and $m'$.

The diagram of FIG. 10 also applies to calculator 49 which calculates the numbers such as $\sigma'_1$ while using a calculator circuit 77 which calculates two very simple functions of the components $\sin(\pi\tau/T)$ and $\cos(\pi\tau/T)$. These two functions will be further explained by means of the diagram of FIG. 11e. This diagram 11e, which can be compared with diagram 9d relative to the reference channel, shows the impulse response of the filter which has the characteristic of FIG. 8, which impulse response is retarded by $(4/3).1(4KHz) = 4T/3$ with respect to the impulse response represented in FIG. 11d. The output numbers such as $\sigma'_1$ are obtained by calculating the weighted sum of the input numbers $S'_k$ present during the duration of this reponse and the weighting coefficients which are equal to the values of this impulse response at the instants at which the input numbers $S'_k$ occur. In view of the fact that the impulse response 11e is delayed by $4T/3$ with respect to that of diagram 11d it may be expressed by the same functions $F_1$, $F_2$, $F_3$ of the formulas (2), (3), (4) on the condition that in these formulas the time $t$ is replaced by $t - 4T/3$.

It is now clear that the formulas (6) and (7) apply to the calculation of the numbers $\tau_1'$ on the condition that $\sin(\pi\tau/T)$ is replaced by $\sin[\pi(\tau-4T/3)/T]$ and $\cos(\pi\tau/T)$ by $\cos[\pi(\tau-4T/3)/T.]$. The diagram of FIG. 10 described sofar for the calculation of numbers such as $\sigma'_0$ is therefore suitable for the calculation of numbers such as $\sigma'_1$ on the condition that a calculator 77 is added which acts as phase shifting circuit. From the two components $\cos(\pi\tau/T)$ and $\sin(\pi\tau/T)$ of the pilot signal this circuit 77 calculates the two functions $\sin[\pi(\tau-4T/3)/T] = \sin(\pi\tau/T - 4\pi/3)$ and $\cos[\pi(\tau-4T/3)/T] = \cos(\pi\tau/T - 4\pi/3)$. While developing these functions it can be seen that the calculation is very simple.

The diagram of FIG. 10 also applies to calculator 53 which calculates number such as $\sigma'_2$. In this case the coefficients to be used are determined from the impulse response of diagram 11f (to be compared with diagram 9e) while this impulse response is delayed by $(8/3).1/(4KHz) = 8T/3$ with respect to the response of diagram 11d. From the preceding explanation it is referred that the diagram of FIG. 10 is suitable for calculating numbers such as $\sigma'_2$ if circuit 77 calculates the two functions $\sin[\pi(\tau-8T/3)/T] = \sin(\pi\tau/T-2\pi/3)$ and $\cos[\pi(\tau-8T/3)/T] = \cos(\pi\tau/T-2\pi/3)$.

Whatever the calculator, the two ciircuits 73 and 74 always calculate the same functions:

$A_o + (1-A_o)Pr+$ $A_o + A_o (Pi - 1 - Pr)/2$ $Pr$ and $Pi$ being the real and imaginary components of the pilot signal which are either not shifted in phase or shifted in phase by phase shifting circuit 77.

It will be seen that compared to a known automatic adaptive equalizer, provided with a filter of which all the coefficients are variable and controlled by complicated calculating circuits, the calculator of FIG. 10 comprises a filter having only two variable coefficients, whose value is a very simple function of the two components of the pilot signal.

What is claimed is

1. A parallel data transmission system in which data signals are converted into multilevel digital signals and transmitted through channels of a frequency division multiplex system, which channels are separated by means of digital filters having a linear phase characteristic, each channel comprising two quadrature sub-channels for transmitting two data signals which jointly constitutes a complex data signal transmitted by said channel characterized in that the transmitter side comprises means for adding to the data signal in one of the said sub-channels of each channel a pilot signal whose frequency is half the interval between adjacent center frequencies of the said multiplex channels and in that the receiver side successively comprises filter means at the output of each channel for selecting the complex signal corresponding to the transmitted pilot signal, means for subtacting from the received complex signal in each channel the received complex pilot signal to obtain the received complex data signal, phase shifting means for shifting the phase of the said received complex data signal over an angle of equal magnitude but of opposite sign of the phase of the received complex pilot signal, and a pair of digital filter circuits for processing the complex data signal supplied by the said phase shifting means, said filter circuits being identical and having the transfer function of a low-pass filter with a cut-off frequency equal to the pilot signal frequency, each filter circuit comprising at least a calculating unit constructed as a digital filter and comprising a first fixed coefficient part at whose input the data signal is multiplied by a predetermined component of the received complex pilot signal, and a second variable coefficient part whose coefficients are derived from the components of the received complex pilot signal.

2. A system as claimed in claim 1, characterized in that the two parts of each calculating unit are arranged for jointly calculating the weighted sum of a limited sequence of data signal numbers occurring during a time interval equal to the duration of the impulse response which corresponds to the said characteristic of the low-pass filter, the second variable coefficient part being arranged to utilize the two numbers which are situated in the center of the said sequence and the first fixed coefficient part being arranged to utilize the other numbers of the said sequence multiplied by the said component of the pilot signal.

3. A system as claimed in claim 1, characterized in that the fixed coefficients used in the first part of a calculating unit are the values of the said impulse response at instants that are odd multiples of $T/2$, except for $T/2$ and $-T/2$, T being the half period of the pilot signal.

4. A system as claimed in claim 2, characterized in that the two variable coefficients are obtained by means of two circuits which calculate the functions $A_o + (1-A_o)Pr$ $A_o + A_o(Pi-1-Pr)/2$ , where $Pr$ and $Pi$ are the real and imaginary components of the pilot signal, $A_o$ being the common value of the said impulse response at the instant $+T/2$ and $-T/2$.

5. A system as claimed in claim 2 characterized in that each calculating unit comprises a circuit which detects the sign of a predetermined component of the pilot signal, the output of this circuit actuating a switching circuit to delay the data signal for a duration equal to T or not to delay the data signal at the input of the said calculating unit.

6. A system as claimed in claim 2, characterized in that each calculating unit comprises a logic circuit for detecting whether the two components of the pilot signal have the same sign or different signs, the output of this logic circuit actuating a switching circuit to permute said two varible coefficients supplied to the second part of the said calculating unit.

7. A system as claimed in claim 1, characterized in that each filter circuit comprises various calculating units in parallel branches for calculating the output numbers by interpolation between the input numbers at interpolation instants, which are shifted with respect to one another, these calculating units further comprising means for shifting the phase of the two components of the received pilot signal over an angle corresponding to the shifts in the interpolation instants, these two phase shifted components being used in the circuits of the calculating units.

* * * * *